US012234139B2

(12) United States Patent
Torak et al.

(10) Patent No.: US 12,234,139 B2
(45) Date of Patent: Feb. 25, 2025

(54) FLUID DISPENSING SYSTEMS AND METHODS

(71) Applicant: Kraus USA Plumbing LLC, Port Washington, NY (US)

(72) Inventors: Serhiy Torak, Brooklyn, NY (US); Todd Alexander, Hollis, NH (US)

(73) Assignee: Kraus USA Plumbing LLC, Port Washington, NY (US)

( * ) Notice: Subject to any disclaimer, the term of this patent is extended or adjusted under 35 U.S.C. 154(b) by 0 days.

(21) Appl. No.: 18/243,791

(22) Filed: Sep. 8, 2023

(65) Prior Publication Data

US 2023/0416073 A1 Dec. 28, 2023

Related U.S. Application Data

(63) Continuation of application No. 17/558,683, filed on Dec. 22, 2021, now Pat. No. 11,753,293.

(51) Int. Cl.
*B67D 1/12* (2006.01)
*B67D 1/00* (2006.01)

(52) U.S. Cl.
CPC ......... *B67D 1/1277* (2013.01); *B67D 1/0004* (2013.01); *B67D 2001/0091* (2013.01); *B67D 2210/0001* (2013.01)

(58) Field of Classification Search
CPC ................ B67D 1/1277; B67D 1/0004; B67D 2001/0091; B67D 2210/0001; B67D 1/04;
(Continued)

(56) References Cited

U.S. PATENT DOCUMENTS 1,609,811 A * 12/1926 Gerhardt .................. B67D 1/04
222/146.1
5,417,348 A 5/1995 Perrin et al.
(Continued)

FOREIGN PATENT DOCUMENTS

CN 101539210 B 10/2012
CN 105198013 A 12/2015
(Continued)

OTHER PUBLICATIONS

Grohe, Chilled, Sparkling Water on Tap, retrieved on Feb. 1, 2021 from https://www.grohe.US/kitchen/design-trends/chilled-sparkling-water.

*Primary Examiner* — Donnell A Long
(74) *Attorney, Agent, or Firm* — Bose McKinney & Evans LLP

(57) ABSTRACT

A dispenser system includes a first container configured to contain a first fluid, a second container configured to contain a second fluid, a faucet coupled with the first container and the second container via first and second hoses, respectively, and including first and second switches installed on the faucet, and a controller configured to control dispensing of the first and second fluids through the faucet. When the first switch is turned on while the second switch is turned off, the controller dispenses the first fluid to the faucet through the first hose. When the first switch is turned off while the second switch is turned on, the controller dispenses the second fluid to the faucet through the second hose. The dispenser system is configured and dimensioned to prevent cross contamination between the first and second hoses.

23 Claims, 5 Drawing Sheets

(58) Field of Classification Search
CPC ...... B67D 1/0003; B67D 1/07; B67D 1/0888; B67D 1/12; B67D 1/1252; B67D 1/0042; B67D 1/0057; B67D 1/0061; B67D 1/0069; B67D 1/0081; B67D 1/08; B67D 1/0857; B67D 2001/0094; B67D 2001/0095; B67D 2001/0493
See application file for complete search history.

(56) References Cited

U.S. PATENT DOCUMENTS

| | | | | |
|---|---|---|---|---|
| 5,984,142 | A | 11/1999 | Castaldi | |
| 6,182,863 | B1 * | 2/2001 | Van Der Meer | B67D 1/0462 222/61 |
| 6,286,721 | B1 | 9/2001 | Pellegrini | |
| 6,302,299 | B1 | 10/2001 | Baker et al. | |
| 6,394,311 | B2 | 5/2002 | McCann et al. | |
| 7,080,525 | B2 | 7/2006 | McCann et al. | |
| 8,091,737 | B2 | 1/2012 | Smeller et al. | |
| 8,893,927 | B2 | 11/2014 | Olson et al. | |
| 9,409,758 | B2 | 8/2016 | McHale et al. | |
| 9,919,939 | B2 | 3/2018 | Rosko et al. | |
| 10,183,871 | B2 | 1/2019 | Ye | |
| 2003/0098314 | A1 * | 5/2003 | Phelps | B67D 1/0406 222/1 |
| 2007/0028974 | A1 | 2/2007 | Herring | |
| 2016/0214041 | A1 | 7/2016 | Miller et al. | |
| 2017/0319990 | A1 * | 11/2017 | Jeon | B67D 1/14 |
| 2018/0251361 | A1 | 9/2018 | Wing et al. | |
| 2018/0258621 | A1 | 9/2018 | Binary | |
| 2018/0313068 | A1 * | 11/2018 | Hirsch | E03C 1/0403 |
| 2019/0270630 | A1 | 9/2019 | Dahan et al. | |
| 2022/0217989 | A1 * | 7/2022 | Rubin | A23G 1/0036 |
| 2022/0396468 | A1 * | 12/2022 | Romero | B67D 7/82 |

FOREIGN PATENT DOCUMENTS

| | | | | |
|---|---|---|---|---|
| CN | 105353690 | B | 6/2018 | |
| EP | 1669322 | A1 | 6/2006 | |
| GB | 2457434 | A1 | 8/2009 | |
| WO | WO-2014057433 | A2 * | 4/2014 | B67D 1/0004 |
| WO | WO-2014081294 | A2 * | 5/2014 | B01F 3/04808 |
| WO | 2022023487 | A1 | 2/2022 | |

* cited by examiner

FLUID DISPENSING SYSTEMS AND METHODS

CROSS-REFERENCE TO RELATED APPLICATION

The present application is a continuation of U.S. patent application Ser. No. 17/558,683, filed Dec. 22, 2021, the disclosure of which is expressly incorporated herein by reference.

FIELD

The present disclosure generally relates to fluid dispensing systems and methods for dispensing different types of fluids, where one type of fluid may include a gas.

BACKGROUND

Generally, consumers consume large volumes of beverages such as coffee, soft drinks, soda, juices, teas, water, energy drinks, flavored waters, and many other drinks on a daily basis. To maintain an adequate supply of such beverages, consumers must continuously supply their homes with various bottled and canned beverages, or must make beverages such as coffee, tea, iced tea, lemonade, carbonated water or flavored waters by hand. These tasks can be relatively burdensome for families which experience a large consumption of beverages, in part because the beverage containers are somewhat heavy, the beverage containers occupy substantial space in their refrigerators, and the time to make the beverages can be substantial on an annual basis. Additionally, the cost in dollars and time of purchasing such beverages on an annual basis can be significant as indicated above.

Commercial drink dispensing machines and systems for monitoring such drink dispensing machines are well known. Certain types of non-commercial drink dispensing systems are also well known, for example countertop beverage dispensing systems.

Many conventional refrigerators are equipped with ice-makers and water dispensers for dispensing ice and filtered water. It is also known that refrigerators can be used to dispense other drinks. This system reduces the need for consumers to store drink containers in their refrigerators because this system uses a concentrated drink supply or syrup. However, a consumer using this type of system must keep track of the drink supply or syrup levels and the CO2 gas levels, must regularly purchase the drink supply or syrup and CO2 gas supply and must maintain and repair such dispensing systems. Such systems are also not readily adapted for dispensing a plurality of drinks, enabling the user to readily switch drinks or for facilitating delivery of drink supply without cross contamination. Accordingly, there is a need for an improved in-home or residential beverage distribution and dispensing system.

SUMMARY

The techniques of this disclosure generally relate to a fluid dispensing system, methods for dispensing different types of fluids, and methods for extruding fluids remaining in dispensing tubes after completely dispensing the fluids.

Provided in accordance with aspects of the disclosure is a dispenser system for dispensing different types of fluids. The dispenser system includes a first container configured to contain a first fluid, a second container configured to contain a second fluid, a faucet coupled with the first container and the second container via first and second hoses, respectively, and including first and second switches installed on the faucet, and a controller configured to control dispensing of the first and second fluids through the faucet. When the first switch is turned on while the second switch is turned off, the controller dispenses the first fluid to the faucet through the first hose. When the first switch is turned off while the second switch is turned on, the controller dispenses the second fluid to the faucet through the second hose. The dispenser system is configured and dimensioned to prevent cross contamination between the first and second hoses.

In aspects, the first fluid is tap water.

In aspects, the dispenser system further includes a pump configured to supply air to the second hose when the second switch is turned off.

In aspects, the dispenser system further includes a filter configured to filter the first fluid. When the second switch is turned on while the first switch is turned on, the controller stops dispensing the first fluid to the first hose and starts dispensing the filtered first fluid to the faucet through the second hose.

In aspects, the filtered first fluid remaining in the second hose is drained out based on the supplied air when the second switch is turned off.

In aspects, the second container includes a second valve configured to open the second container.

In aspects, the second container includes a second pump configured to supply air to the second container.

In aspects, when the second switch is turned on while the first switch is turned off, the second pump supplies air to the second container to supply the second fluid to the second hose.

In aspects, the second valve is mechanically opened or closed.

In aspects, the second switch sends an electrical signal to the second valve so that the second valve is electrically opened or closed.

In aspects, when the second switch is turned off, the second valve is closed.

In aspects, when the second switch is turned off, the second fluid remaining in the second hose is drained out based on the supplied air.

In aspects, a gas is released from the second fluid in the second container.

In aspects, the gas is carbon dioxide.

In aspects, when the second switch is turned on while the first switch is turned off, the second container supplies the second fluid to the second hose based on a pressure caused by the released gas from the second fluid.

Provided in accordance with aspects of the disclosure is a method for dispensing a first fluid contained in a first container or a second fluid contained in a second container through a faucet, which is coupled with the first container and the second container via first and second hoses, respectively, and including first and second switches installed on the faucet. The method includes receiving a signal from the first switch, which indicates the first switch is turned on or off, receiving a signal from the second switch, which indicates the second switch is turned on or off, when the first switch is turned on while the second switch is turned off, dispensing the first fluid to the faucet through the first hose, and when the first switch is turned off while the second switch is turned on, dispensing the second fluid to the faucet through the second hose. Contamination between the first and second hoses is prevented.

In aspects, the first fluid is tap water.

In aspects, the method further includes supplying air to the second hose when the second switch is turned off.

In aspects, the method further includes filtering the first fluid, and when the second switch is turned on while the first switch is turned on, stopping dispensing the first fluid to the first hose and starting dispensing the filtered first fluid to the faucet through the second hose.

In aspects, the method further includes draining out the filtered first fluid remaining in the second hose based on the supplied air when the second switch is turned off.

In aspects, the method further includes supplying air to the second container.

In aspects, the method further includes when the second switch is turned on while the first switch is turned off, supplying the second fluid to the second hose based on the air supplied to the second container.

In aspects, the method further includes when the second switch is turned off, draining out the second fluid remaining in the second hose based on the air supplied to the second hose.

In aspects, a gas is released from the second fluid in the second container.

In aspects, the gas is carbon dioxide.

In aspects, the method further includes when the second switch is turned on while the first switch is turned off, supplying the second fluid to the second hose based on a pressure caused by the released gas from the second fluid.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Fluids may be manually or electrically dispensed by a dispensing device. In a case when a gas (e.g., carbon dioxide) is dissolved in a fluid, the fluid may be dispensed based on the pressure caused by the released gas via a tube through a faucet. In another case when a fluid does not dissolve a gas, air may be provided to the container and the fluid may be dispensed based on the pressure caused by the supplied air via a tube through the faucet. The fluids remaining in the tubes, which connect between the containers and the faucet, may be automatically extruded by a pump after completely dispensing the fluid.

Figure 1:
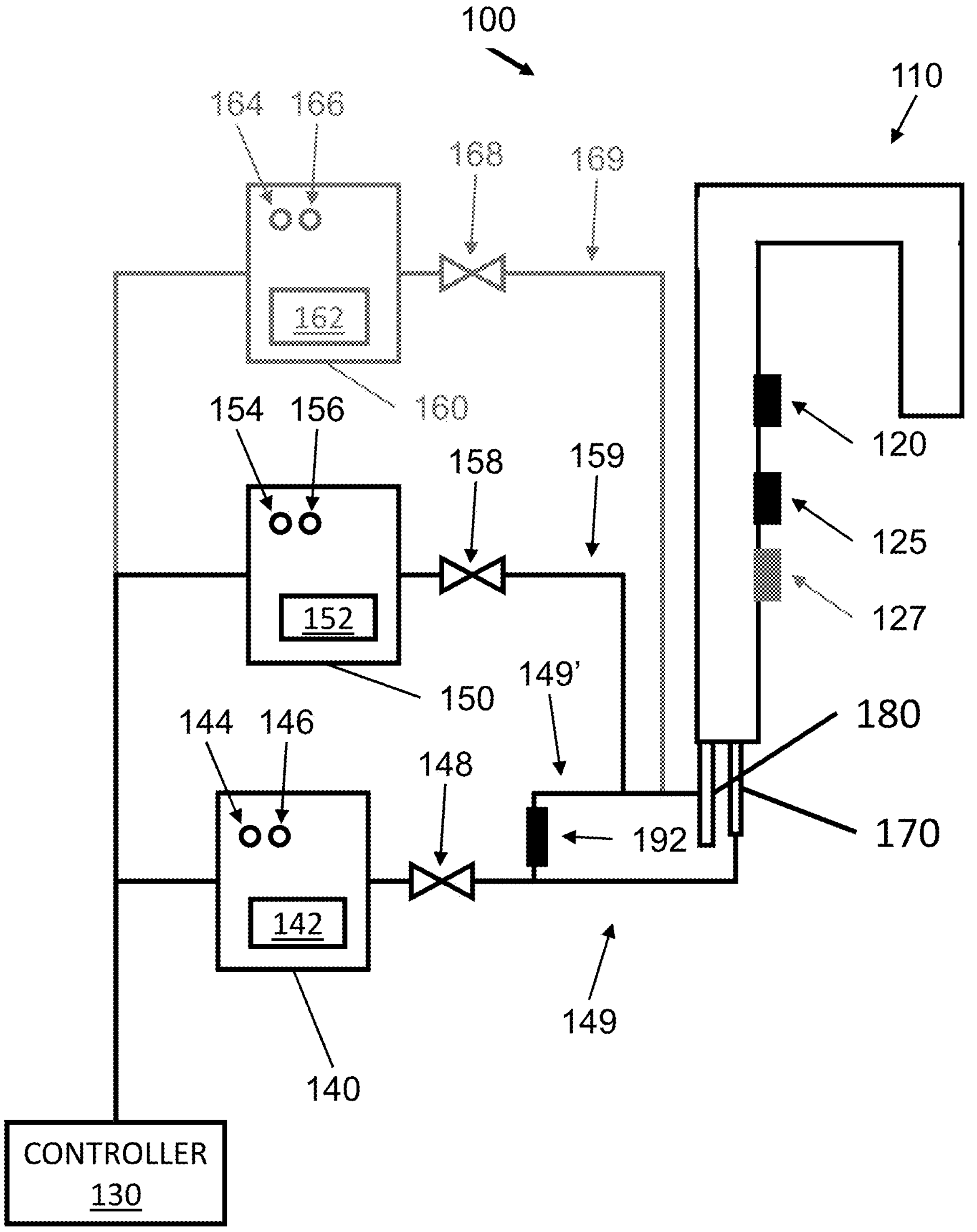
FIG. 1 is a block diagram of a fluid dispensing system for dispensing fluids according to aspects of the present disclosure.

FIG. 1 shows a block diagram of a dispensing system 100 for dispensing fluids according to aspects of the present disclosure. The dispensing system 100 may include a faucet 110, a first dispensing switch 120, a second dispensing switch 125, a controller 130, a first container 140, and a second container 150. The faucet 110 may include a first faucet hose 170 and a second faucet hose 180 as a passageway for dispensing fluids. When the first dispensing switch 120 is pressed or turned on, a first fluid may be dispensed from the first container 140 through the first faucet hose 170 to the faucet 110. When the second dispensing switch 125 is pressed or turned on, a second fluid may be dispensed from the second container 150 through the second faucet hose 180 to the faucet 110.

The faucet 110 may be a pull-down faucet. The faucet 100 may not require a handle to manually open and close. Spout of the faucet 110 may include all kinds of flow, for example, a sprayer, a strong flow, or softer flow depending on the liquid dispensed. In an embodiment, when the fluid is beer, spout of the faucet 110 includes slower flow to avoid forming foam.

The first and second dispensing switches 120 and 125 may be a toggle switch so that another push may stop dispensing of the fluids. In an aspect, the first and second dispensing switches 120 and 125 may be activated when the first and second dispensing switches 120 and 125 are pressed for a predetermined period, such as 0.5 seconds or longer, thereby preventing accidental activation of the first and second dispensing switches 120 and 125.

The first and second faucet hoses 170 and 180 may be disposed separately and individually within the faucet 110 so that fluids in the first and second faucet hoses 170 and 180 cannot be mixed in the faucet 110. In other words, the fluids in the first and second faucet hoses 170 and 180 cannot cross contaminate with each other.

In embodiments, the fluid dispensing system 100 may comprise at least two containers or more based on a number of different types of fluids desired. In this regard, a third container 160 may be optionally added and a corresponding third switch 127 may be also added. The first container 140 may be a representative container containing a first type of fluid (the "first fluid"), which may be tap water.

The first container 140 may include a pump 142 configured for supplying or removing air from the first container 140. The pump 142 may be coupled to the pressure button 144. When the pressure in the first container 140 is lower than the predetermined pressure and the pressure button 144 is pressed, the pump 142 may provide air into the first container 140 so as to adjust the pressure to a predetermined pressure. When the pressure is higher than the predetermined pressure and the pressure button 144 is pressed, the pump 142 may release air from the first container 140 so as to decrease the pressure to a predetermined pressure.

The first container 140 may include a valve 148, which may be electrical or mechanical. When the first dispensing switch 120 is turned on, an electric signal may be transmitted to the controller 130 to open the valve 148 in a case when the valve 148 is an electrical valve. In a case when the valve 148 is mechanical, the valve 148 may be mechanically opened and generally maintained in an open position so that when the first dispensing switch 120 is turned on or pressed, the first fluid is automatically supplied to the first faucet hose 170.

The first fluid may be filtered by a filter 192 installed along a detour tube 149'. In a case when the first fluid is tap water, the filter 192 filters the tap water along the detour tube 149' and the filtered water may be supplied to the second faucet hose 180 in the faucet 110. The filter 192 may be an osmosis-type filter, an ozone generator, or any type of filters, which can filter the tap water of contaminants and chemicals. In an aspect, the filter 192 may be installed anywhere between the switch 149 and the opening of the faucet 110. In an aspect, the filter 192 may be a single filter system, a double filter system, or multiple filter system.

In order to supply the filtered fluid, the first dispensing switch 120 needs to be turned on first to supply the tap water through the first faucet hose 170. While the first dispensing switch 120 is turned on, the second switch is turned on second to supply the filtered fluid. Specifically, when the second switch is turned on while the first switch is turned on, supply of the tap water is stopped, and the tap water is detoured to the detour tube 149' so that the tap water goes through the filter 192 and the filtered water is supplied to the second faucet hose 180. In this situation, when the second dispensing switch 125 is turned off, the tap water is detoured back to the first tube 149 and to the first faucet hose 170 so that the tap water and the filtered water are supplied to different faucet hoses. In other words, the tap water and the filtered water cannot be mixed in the faucet 110 so that there is no cross contamination between the tap water and the filtered water.

After the filtered water is sufficiently supplied, the second switch may be turned off. Then, the pump 142 may supply air to the detour tube 149' and to the second faucet hose 180 so that the filtered water remaining in the detour tube 149' and in the second faucet hose 180 may be drained out. In this way, no fluid may be maintained in the detour tube 149' and in the second faucet hose 180 after completion of suppling of the filtered water, thereby preventing possible fermentation or contamination in the detour tube 149' and in the second faucet hose 180 when the system is not in use.

The second container 150 may contain a second type of fluid (the "second fluid"), which dissolves gas. For example, the second fluid may include a beer, soda, nitro coffee, carbonated water, etc. In an aspect, the second container 150 may also contain a third type of fluid (the "third fluid"), which does not dissolve gas. For example, the third fluid may include cold brew coffee, liquor, alcohol, tea, etc.

The second container 150 may include a pressure button 154, a cooling button 156, and a valve 158. When a user wants to consume the second fluid, the user may turn on the valve 158. The second fluid may release the gas while contained in the second container 150. The released gas may increase pressure in the second container 150. Such pressure may be used in dispensing the second fluid. When the second dispensing switch 125 is turned on while the first dispensing switch 120 is maintained off, due to the pressure caused by the released gas in the second container 150, the second fluid is then dispensed via a second tube 159 to the second faucet hose 180 in the faucet 110.

When the pressure inside the second container 150 is higher than a predetermined pressure suitable for dispensing the second fluid, burst-dispensing happens, and when the pressure is lower than the predetermined pressure, the second fluid may not be dispensed in full capacity. Thus, when the pressure is different from the predetermined pressure, the pressure may be adjusted to the predetermined pressure by pressing the pressure button 154.

The second container 150 further includes a pump 152 configured for supplying or removing air from the second container 150. The pump 152 may be coupled to the pressure button 154. When the pressure is lower than the predetermined pressure and the pressure button 154 is pressed, the pump 152 may provide air into the second container 150 so as to adjust the pressure to the predetermined pressure. When the pressure is higher than the predetermined pressure and the pressure button 154 is pressed, the pump 152 may release gas or air from the second container 150 so as to decrease the pressure to the predetermined pressure.

In an aspect, the pump 152 may provide the gas, which is the same as the gas released from the second fluid, to the second container 150. By providing the same gas, the taste or flavor of the second fluid may be well preserved in the second container 150.

The pump 152 may further provide air to the second tube 159 after completely dispensing the second fluid. By increasing the pressure within the second tube 159, the second fluid remaining in the second tube 159 and the second faucet hose 180 can be extruded. Specifically, when the second dispensing switch 125 is turned on while the first switch is maintained off, the second fluid is supplied to the second tube 159 and to the second faucet hose 180. After dispensing the second fluid, the second dispensing switch 125 may be turned off. Then, the second valve 158 may be likewise turned off and the pump 152 may automatically supply the air into the second tube 159 and to the second faucet hose 180 so that the remaining fluid therein can be removed. In this way, a possibility of fermentation or changes to the second fluid within the second tube 159 and the second faucet hose 180 can be prevented or lowered. Furthermore, cross contamination between fluids in the first and second faucet hoses 170 and 180 is prevented.

The cooling button 156 may control the temperature of the second fluid in the second container 150. Generally, beverages can be consumed with full satisfaction when drunk at a certain temperature. For example, an ideal temperature for beer may be lower than 60° F., 45° F., or 10° F. Thus, by pressing the cooling button 156, the temperature of the second fluid can be adjusted to the ideal temperature. The cooling button 156 may be coupled to a compressor (which is not shown), which compresses a refrigerant for reducing the temperature of the second fluid. Other mechanisms, which can be readily appreciated by a person having ordinary skill in the art, may be also employed for cooling the fluid or container.

In an aspect, the second fluid may be electrically dispensed. In this case, the valve 158 may be electrically turned to an open or an on state. That is, when the second dispensing switch 125 is pressed for at least a predetermined period (e.g., 0.5 seconds), an electrical signal is relayed to the controller 130 to turn on or open the valve 158. When it is turned on, the second fluid may be dispensed to the second faucet hose 180 in the faucet 110 due to the pressure caused by the gas released from the second fluid.

In a case when the second container 150 contains the third fluid, which does not dissolve a gas, the pump 152 may control the pressure in the second container 150 by supplying air thereto. Thus, when the second dispensing switch 125 is pressed or turned on, the third fluid may be dispensed to the second tube 159 and to the second faucet hose 180 in the faucet 100. The remaining third fluid may be removed in the same way as removing the second fluid.

When there is a need to provide more than two fluids through the faucet 110, more than two containers and more than two switches may be provided. As shown in FIG. 1, for example, the third container 160 and the third switch 127 are shown in grey indicating that they are optional. In an aspect, the number of the containers may be equal to the number of switches installed on the faucet 110.

Similar to the second container 150, the third container 160 may include a pump 162, a pressure button 164, a cooling button 166, a third switch 168, and a third tube 169. These elements of the third container 160 work similar to those of the second container 150. Thus, descriptions thereof are omitted here and can be found in the descriptions of the second container 150.

In an aspect, the faucet 110 may include a handle or valve to manually control dispensing fluids. Even when the faucet switches 120 and 125 and container valves 148 and 158 are open or turned on, the first and second fluids may be dispensed only when the handle valve is open or moved to an on position. When it is unknown how much of the fluid is to be dispensed, the user of the dispensing system 100 is capable of dispensing the first or second fluid as much as needed. When the handle or valve is manually closed by the user, another electrical signal may be transmitted to the valve 148 or 158 so that the valve 148 or 158 is closed.

Furthermore, when the handle or valve is manually closed, the electrical signal, which indicates completion of dispensing, is transmitted to the pumps 142 and 152. In due course, the pumps 142 or 152 may provide air to the detour tube 149' or the third tube 159 and the second faucet hose 180, respectively, so that the fluid remaining in the corresponding tube and the corresponding faucet tube can be removed or extruded. In other words, the pumps can perform a self-cleaning action on the fluid remaining in the tubes.

The controller 130 may control dispensing fluids and extruding remaining fluids in the tubes. The controller 130 may also control temperatures of the first, second, and third fluids. When the first dispensing switch 120 is pressed, the controller 130 may relay the electrical signal to the corresponding elements. For example, when the first fluid is selected and the first dispensing switch 120 is pressed, the controller 130 may control the temperature of the third fluid to match the temperature of the first fluid.

In an aspect, the controller 130 may check the pressure and temperature of the first container 140 and the second container 150. When the pressure and temperature of the first container 140 and the second container 150 do not fall within the suitable range, the controller 130 may electrically activate the pressure buttons 144, 154 and the temperature buttons 146 and 156 to adjust the temperature and pressure in the first container 140 and the second container 150 to predetermined suitable ranges.

The controller 130 may also check whether there is a sufficient amount of the first and second fluids contained in the first container 140 and the second container 150. When there is not sufficient fluid in the first container 140 and the second container 150, the controller 130 may provide a warning to a user of the dispensing system 100. The warning may be a color or light indicator and be provided in a display screen or may be a sound indicator emitted from a speaker incorporated into the display screen. In an aspect, the warning may be a flashing red light or an audible sound to attract attention of the user.

Figure 2:
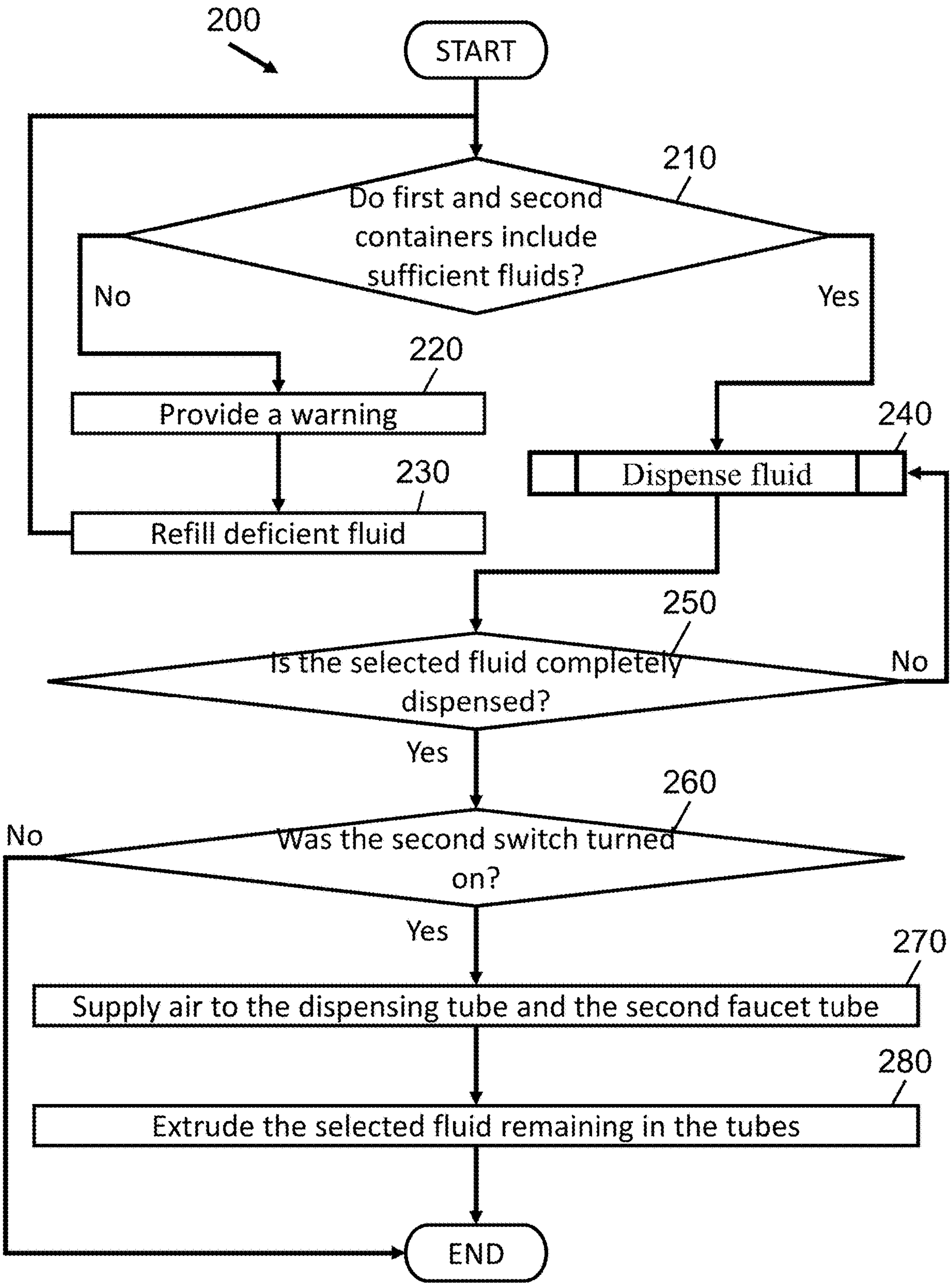
FIG. 2 is a flow diagram for dispensing fluids in accordance with aspects of the present disclosure.

Referring to FIG. 2, a method 200 is provided for dispensing different types of fluids according to aspects of the present disclosure. The method 200 may include first checking whether or not first and second containers contain a predetermined amount of first and second fluids, respectively, in step 210. The first and second fluids may be different from each other. The second fluid may include gas dissolved therein and the first fluid may not. In this regard, the second fluid may be dispensed by the pressure generated by the gas released from the second fluid, and the first fluid may be dispensed by the pressure supplied by a pump.

When it is determined that the first or second container does not include sufficient amounts of fluid, a warning, which indicates insufficiency, may be provided in step 220. In an aspect, the warning may be displayed on a screen installed on the respective container or on the dispensing switch on the faucet. In an aspect, the warning may be a flashing or solid red light. In another aspect, the warning may be an audible sound to attract attention from the user.

In step 230, the fluid is refilled and checking of the fluid is also performed in step 210. In this way, the warning may be maintained until the fluid is refilled up to a predetermined amount.

When it is determined that the first and second containers include sufficient amounts of fluids, respectively, the first or second fluid is dispensed in step 240. Detailed description for dispensing of the first and second fluids can be found below in the description for FIGS. 3A-3C.

A user may select a fluid among the first and second fluid for dispensing. In step 250, it is determined whether or not the selected fluid is completely dispensed. In steps 240 and 250, the selected fluid may be dispensed until its completion. In an aspect, the user may manually stop the dispensing of the selected fluid in step 250 by turning off the dispensing switch. In another aspect, the user may select one or predetermined amounts based on the size of a cup or glass. In this case, the dispensing of the selected amount may be completed by automatically turning off the dispensing switch.

After completion of the dispensing of the selected fluid, it is determined whether or not the second switch was turned on in step 260. If the second switch was not turned on, the method 200 is completed.

When it is determined that the second switch is determined to be turned on in step 260, air is supplied to the dispensing tube and the second faucet hose used for dispensing the selected fluid in step 270. The dispensing tube may be a detour tube connected between the first container and the second faucet hose in a case when the first dispensing switch is turned on as well, and may be the second tube connected between the second container and the second faucet hose in a case when the first dispensing switch is turned off.

Since a portion of the selected fluid may remain in the dispensing tube and the second faucet hose after completing the dispensing, the remaining fluid may be extruded from the tubes by pressure caused by the supplied air in step 280. The selected fluid may be the filtered first fluid when both the first and second dispensing switches are turned on, or the second fluid when only the second dispensing switch is turned on. As such, probability of fermentation or contamination in the tubes may be substantially reduced.

In an aspect, instead of providing air, a pump may be used to pull or suck the remaining fluid left in the dispensing tube and the second faucet hose in step 280. The purpose of step 270 is to provide pressure to remove the fluid remaining in the tubes. Thus, any other means of providing pressure to remove the selected fluid may be used to fulfill such purpose.

Figure 3A:
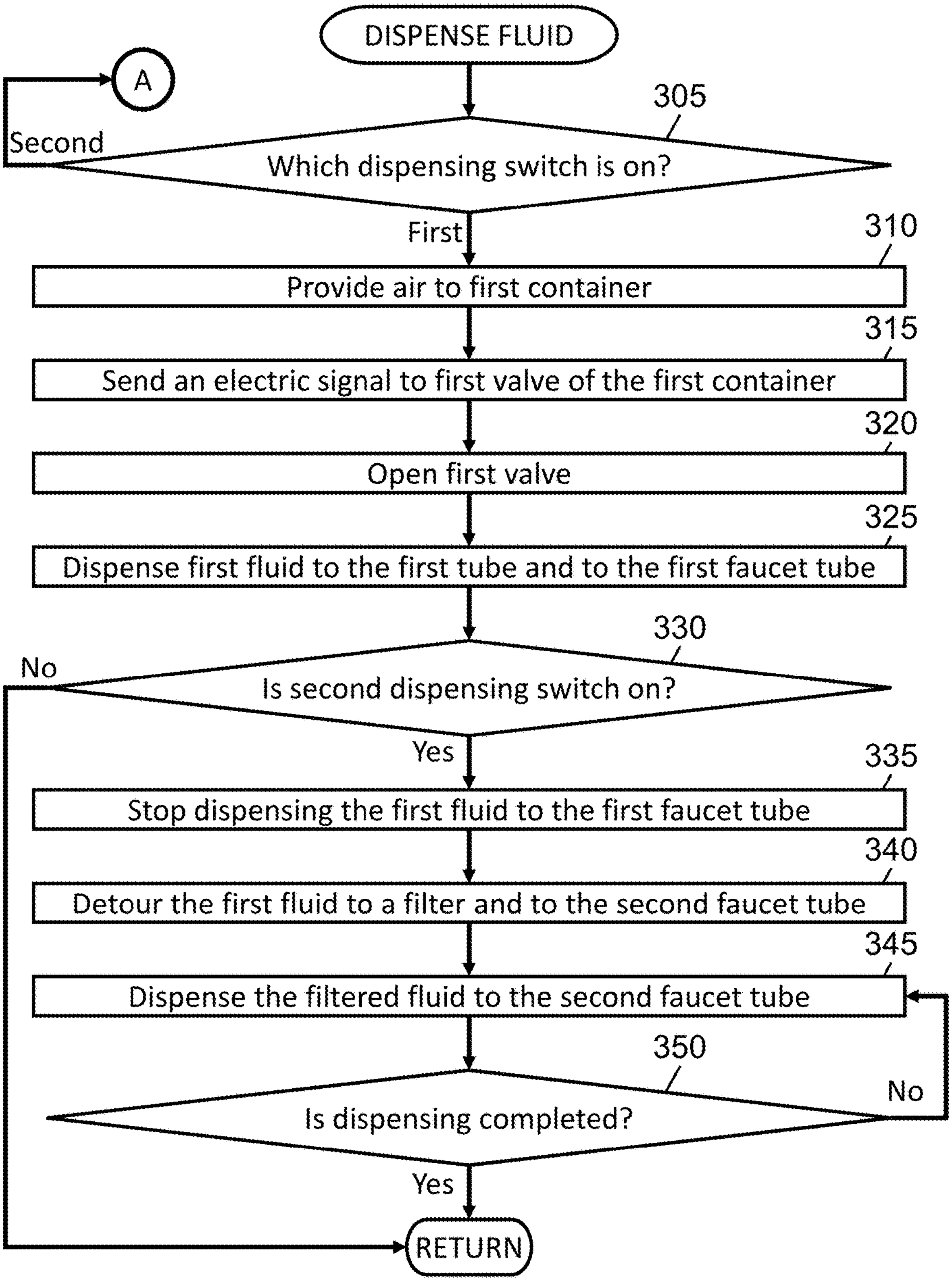
FIGS. 3A-3C are flow diagrams for dispensing fluids according to aspects of the present disclosure.
Figure 3B:
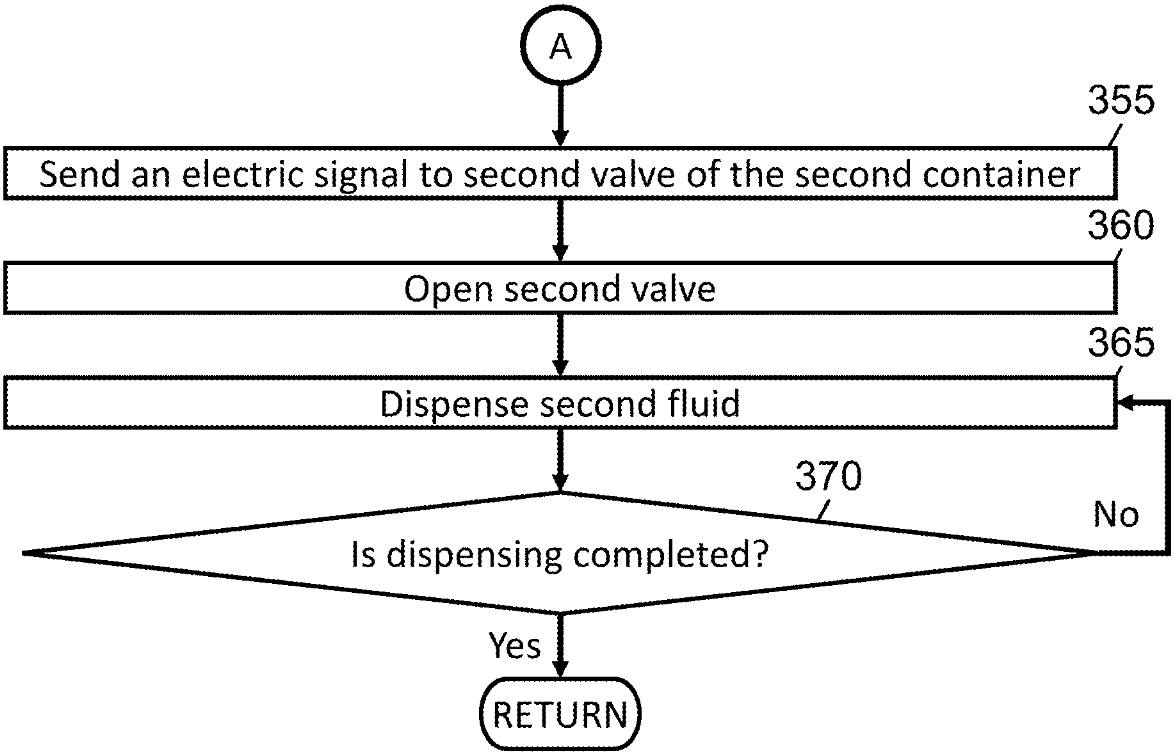
Figure 3C:
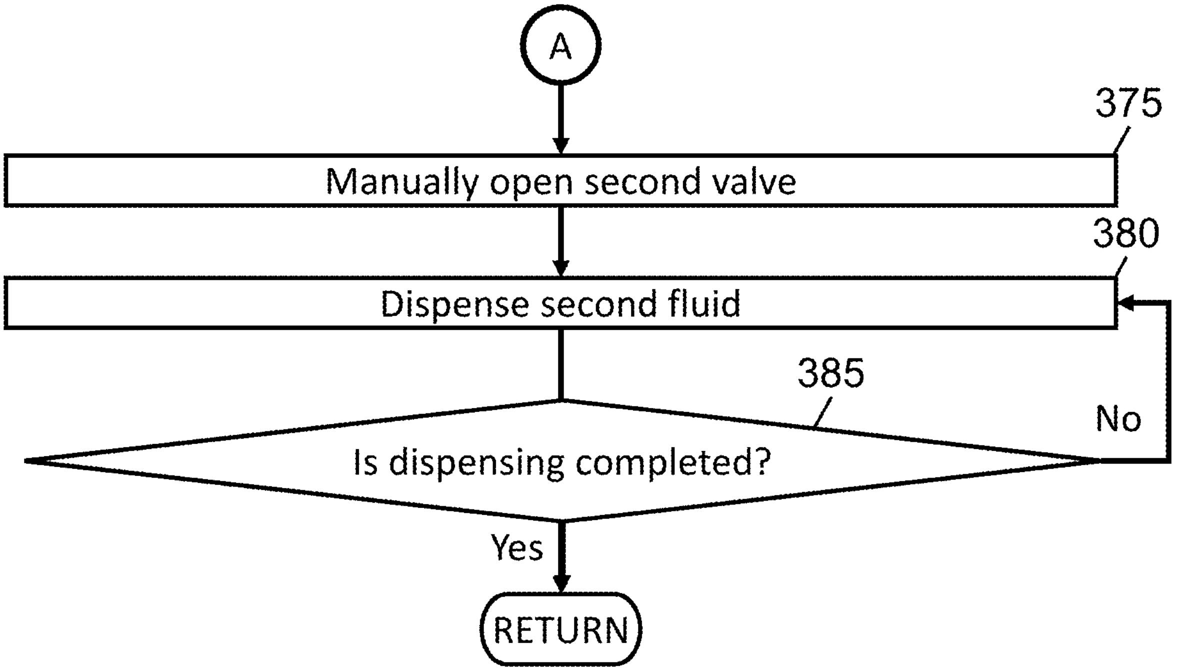

Dispensing different types of fluids in step 240 may be illustrated in FIGS. 3A-3C according to aspects of the present disclosure. In particular, FIG. 3A is directed to dispensing a first type of fluid or a first fluid, which may be tap water. When the first fluid is to be dispensed, pressure is needed to push the first fluid from the first container to the first faucet hose in the faucet.

Then, it is determined which dispensing switch is turned on, in step 305. In a case when the second dispensing switch is turned on, the method 200 is directed to terminal A, which is described in FIGS. 3B and 3C. When it is determined that the first dispensing switch is turned on in step 305, an electrical signal may be sent to the first switch of the first container to open the first container when the user presses the first dispensing switch installed in the faucet.

In step 310, air is provided to the first container. The air may be provided until the pressure inside the first container reaches a predetermined pressure, which is sufficient to push the first fluid through a first faucet hose in the faucet.

When the pressure reaches the predetermined pressure, an electrical signal is provided to a first valve of the first container in step 315. Upon reception of the electrical signal, the first valve is opened in step 320. Due to the pressure in the first container, the first fluid is dispensed through the first faucet hose to the faucet in step 325.

In step 330, it is further determined whether the second dispensing switch is turned on while the first dispensing switch is kept on. In other words, step 330 determines whether both dispensing switches are turned on. When it is determined that the second dispensing switch is not turned on, the first fluid is kept dispensed until completion.

When it is determined that the second dispensing switch is turned on in step 330, the method 200 stops dispensing the first fluid to the first faucet hose in step 335 and detours the first fluid to the second faucet hose in step 340. Along the second faucet hose, a filter may be included which filters the first fluid. In an aspect, the first fluid is tap water and the filter is a water filter.

The first fluid is then filtered through the filter and then dispensed through the second faucet hose in the faucet in step 345. In this way, when a user wants filtered water, the user can switch from unfiltered water to filtered water by turning on the second switch while the first switch is turned on.

In step 350, it is determined whether the dispensing of the filtered fluid is completed. If not, the filtered fluid is continuously dispensed until completion in steps 345 and 350. When dispensing of the filtered fluid is completed, the method 200 returns to step 250. By using two different faucet hoses for unfiltered and filtered fluid, cross contamination can be substantially reduced.

FIGS. 3B and 3C are directed to dispensing a second type of fluid or a second fluid, which includes a gas dissolved therein according to aspects of the present disclosure. The gas may be released from the second fluid in the second container and the released gas may increase pressure in the second container. Thus, there is no need to provide air into the second container to increase pressure to dispense the second fluid.

In particular, FIG. 3B is directed to the second container which includes an electrical valve. When it is determined that the second dispensing switch is turned on in step 305 of FIG. 3A, an electrical signal is transmitted to a second valve of the second container in step 355. The second valve may be electrically turned on in step 360. Through the second valve, the second fluid is dispensed to the second faucet hose in the faucet in step 365.

When it is determined that the dispensing is not completed in step 370, the second fluid is dispensed in step 365, and when it is determined that the dispensing is completed in step 370, the method returns to step 250.

FIG. 3C is directed to the second container which includes a mechanical valve. When the user wants to dispense the second fluid, the user mechanically turns on the mechanical valve in step 375. Then, due to the pressure increased by the gas released from the second fluid, the second fluid is dispensed to the second faucet hose in the faucet in step 380.

When it is determined that the dispensing is not completed in step 385, the second fluid is dispensed in step 380, and when it is determined that the dispensing of the second fluid is completed in step 385, the method returns to step 250.

In an aspect, FIGS. 3B and 3C may further include supplying air to the second container before opening the second valve in step 360 or 375, respectfully, when gas is not dissolved in the second fluid. In this case, the fluid is the third fluid. By providing the air, the internal pressure in the second container is increased so that the third fluid may be dispensed to the second faucet hose in the faucet.

In summary, FIGS. 2-3C illustrate how to mechanically or electrically dispense fluids and how to extrude the fluids remaining in tubes and perform self-cleaning in the tubes, regardless whether a gas is dissolved in the fluids.

Figure 4:
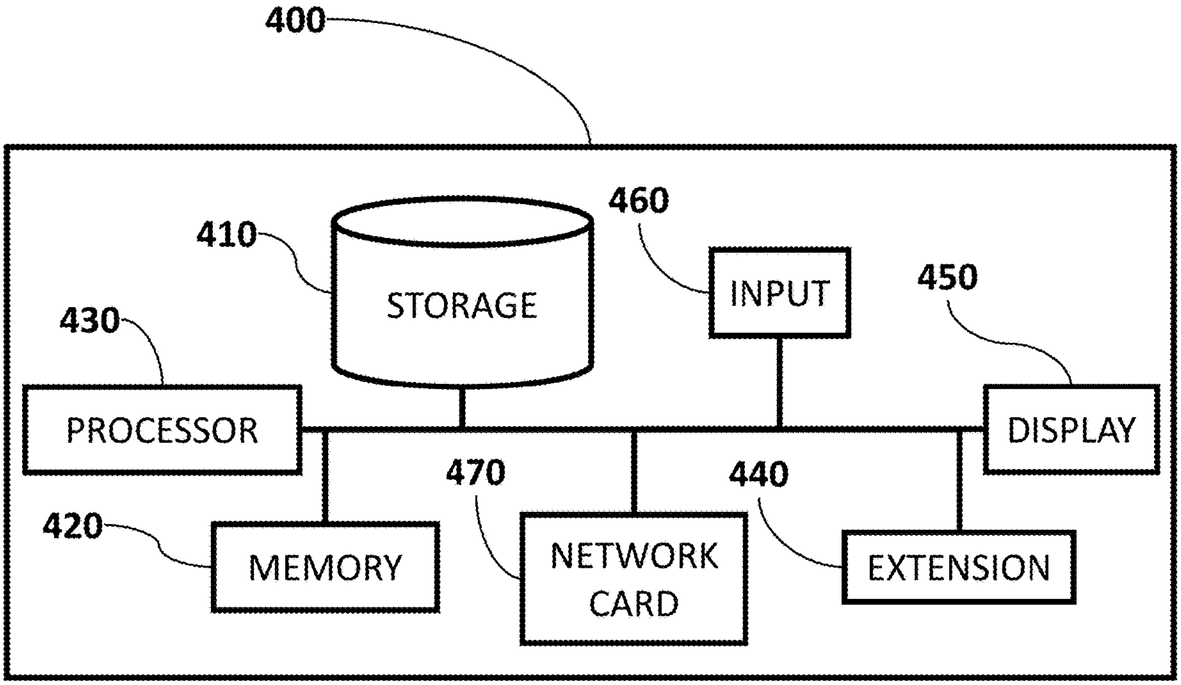
FIG. 4 is a block diagram for a computing device which dispenses fluids and extrudes the fluids remaining in the tubes according to aspects of the present disclosure.

FIG. 4 is a block diagram for a computing device 400, which functions as the controller 130 of FIG. 1, which dispenses fluids and extrudes the fluids remaining in the tube after completely dispensing the fluids, in accordance with aspects of the present disclosure. The computing device 400 may include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, embedded computers, and autonomous vehicles. Those of skill in the art will recognize that many smartphones are suitable for use in the system described herein. Suitable tablet computers include those with booklet, slate, and convertible configurations, known to those of skill in the art.

In aspects, the computing device 400 includes an operating system configured to perform executable instructions. The operating system is, for example, software, including programs and data, which manages the device's hardware and provides services for execution of applications. Those of skill in the art will recognize that suitable server operating systems include, by way of non-limiting examples, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In aspects, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In aspects, the computing device 400 may include a storage 410. The storage 410 is one or more physical apparatus used to store data (e.g., the dilution ratios) or programs for dispensing fluids and extruding the remaining fluids on a temporary or permanent basis. In aspects, the storage 410 may be volatile memory and requires power to maintain stored information. In aspects, the storage 410 may be non-volatile memory and retains stored information when the computing device 400 is not powered. In aspects, the non-volatile memory includes flash memory. In aspects, the non-volatile memory includes dynamic random-access memory (DRAM). In aspects, the non-volatile memory includes ferroelectric random-access memory (FRAM). In aspects, the non-volatile memory includes phase-change random access memory (PRAM). In aspects, the storage 410 includes, by way of non-limiting examples, CD-ROMs, DVDs, flash memory devices, magnetic disk drives, magnetic tapes drives, optical disk drives, and cloud computing-based storage. In aspects, the storage 410 may be a combination of devices such as those disclosed herein.

The computing device 400 further includes a processor 430, an extension 440, a display 450, an input device 460, and a network card 470. The processor 430 is a brain to the computing device 400. The processor 430 executes instructions which implement tasks or functions of programs. When a user executes a program, the processor 430 reads the program stored in the storage 410, loads the program on the RAM, and executes instructions prescribed by the program.

The processor 430 may include a microprocessor, central processing unit (CPU), application specific integrated circuit (ASIC), arithmetic coprocessor, graphic processor, or image processor, each of which is electronic circuitry within a computer that carries out instructions of a computer program by performing the basic arithmetic, logical, control and input/output (I/O) operations specified by the instructions.

In aspects, the extension 440 may include several ports, such as one or more universal serial buses (USBs), IEEE 1394 ports, parallel ports, and/or expansion slots such as peripheral component interconnect (PCI) and PCI express (PCIe). The extension 440 is not limited to the list but may include other slots or ports that can be used for appropriate purposes. The extension 440 may be used to install hardware or add additional functionalities to the computer. For example, a USB port can be used for adding additional storage to the computer.

In aspects, the display 450 may be a cathode ray tube (CRT), a liquid crystal display (LCD), or light emitting diode (LED). In aspects, the display 450 may be a thin film transistor liquid crystal display (TFT-LCD). In aspects, the display 450 may be an organic light emitting diode (OLED) display. In various aspects, the OLED display is a passive-matrix OLED (PMOLED) or active-matrix OLED (AMOLED) display. In aspects, the display 450 may be a plasma display. In aspects, the display may be interactive (e.g., having a touch screen) that can detect user interactions/gestures/responses and the like.

A user may input and/or modify data via the input device 460 that may include a keyboard, a mouse, or any other device with which the use may input data. The display 450 displays data on a screen of the display 450. The display 450 may be a touch screen so that the display 450 can be used as an input device.

The network card 470 is used to communicate with other computing devices, wirelessly or via a wired connection. Through the network card 470, the computing device 400 may receive, modify, and/or update data from and to a managing server.

The aspects disclosed herein are examples of the disclosure and may be embodied in various forms. For instance, although certain aspects herein are described as separate aspects, each of the aspects herein may be combined with one or more of the other aspects herein. Specific structural and functional details disclosed herein are not to be interpreted as limiting, but as a basis for the claims and as a representative basis for teaching one skilled in the art to variously employ the present disclosure in virtually any appropriately detailed structure.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module for purposes of clarity, it should be understood that the techniques of this disclosure may be performed by a combination of units or modules associated with, for example, a fluid dispensing system.

What is claimed is:

1. A dispenser system comprising:

a first container configured to contain a first fluid;

a second container configured to contain a second fluid;

a faucet coupled with the first container and the second container via first and second hoses, respectively, and including first and second switches installed on the faucet; and a controller configured to control dispensing of the first and second fluids through the faucet, wherein, when the first switch is turned on while the second switch is turned off, the controller dispenses the first fluid to the faucet through the first hose, wherein, when the first switch is turned off while the second switch is turned on, the controller dispenses the second fluid to the faucet through the second hose, wherein the dispenser system is configured and dimensioned to prevent cross contamination between the first and second hoses;

wherein air is configured to be supplied to the second hose when the second switch is turned off wherein the first fluid is tap water; and wherein a gas is released from the second fluid in the second container.

2. The dispenser system according to claim 1, further comprising:

a filter configured to filter the first fluid, wherein, when the second switch is turned on while the first switch is turned on, the controller stops dispensing the first fluid to the first hose and starts dispensing the filtered first fluid to the faucet through the second hose.

3. The dispenser system according to claim 1, wherein the first fluid remaining in the second hose is drained out based on the supplied air when the second switch is turned off.

4. The dispenser system according to claim 1, wherein the second container includes a second valve configured to open the second container.

5. The dispenser system according to claim 4, wherein the second container includes a second pump configured to supply air to the second container.

6. The dispenser system according to claim 5, wherein, when the second switch is turned on while the first switch is turned off, the second pump supplies air to the second container to supply the second fluid to the second hose.

7. The dispenser system according to claim 4, wherein the second valve is mechanically opened or closed.

8. The dispenser system according to claim 4, wherein the second switch sends an electrical signal to the second valve so that the second valve is electrically opened or closed.

9. The dispenser system according to claim 8, wherein, when the second switch is turned off, the second valve is closed.

10. The dispenser system according to claim 8, wherein, when the second switch is turned off, the second fluid remaining in the second hose is drained out based on the supplied air.

11. The dispenser system according to claim 1, wherein the gas is carbon dioxide.

12. The dispenser system according to claim 1, wherein, when the second switch is turned on while the first switch is turned off, the second container supplies the second fluid to the second hose based on a pressure caused by the released gas from the second fluid.

13. A dispenser system comprising:
a first container configured to receive a first fluid;
a second container configured to receive a second fluid;
a faucet fluidly coupled to the first container via a first hose, and fluidly coupled to the second container via a second hose;
a first valve fluidly coupled downstream from the first container to control the flow of the first fluid through the first hose;
a second valve fluidly coupled downstream from the second container to control the flow of the second fluid through the second hose;
a controller operably coupled to the first valve and the second valve;
a user interface in electrical communication with the controller;
wherein in a first mode defined by input to the user interface, the controller controls the first valve to dispense the first fluid to the faucet through the first hose;
wherein in a second mode defined by input to the user interface, the controller controls the second valve to dispense the second fluid to the faucet through the second hose;
wherein the controller causes air to be supplied to the first hose to expel the first fluid therefrom when changing from the first mode to the second mode; and
wherein the controller causes air to be supplied to the second hose to expel the second fluid therefrom when changing from the second mode to the first mode.

14. The dispenser system of claim 13, wherein:
the first valve is an electrical valve in electrical communication with the controller; and
the second valve is an electrical valve in electrical communication with the controller.

15. The dispenser system of claim 13:
wherein the user interface includes a first switch and a second switch supported by the faucet;
when the first switch is turned on while the second switch is turned off, the controller dispenses the first fluid to the faucet through the first hose; and
when the first switch is turned off while the second switch is turned on, the controller dispenses the second fluid to the faucet through the second hose.

16. The dispenser system of claim 13, wherein the first fluid is tap water.

17. The dispenser system of claim 13, further comprising:
a first pump configured to supply air to the first hose when the controller changes from the first mode to the second mode; and
a second pump configured to supply air to the second hose when the controller changes from the second mode to the first mode.

18. A dispenser system comprising:
a first container configured to contain a first fluid;
a second container configured to contain a second fluid;
a faucet fluidly coupled to the first container via a first hose, and fluidly coupled to the second container via a second hose;
a controller configured to control dispensing of the first and second fluids through the faucet;
a first pressure input in electrical communication with the controller for controlling a pressure of the first fluid in the first container;
a first temperature input in electrical communication with the controller for controlling a temperature of the first fluid in the first container;
wherein in a first mode the controller dispenses the first fluid to the faucet through the first hose;
wherein in a second mode the controller dispenses the second fluid to the faucet through the second hose; and
the controller causes air to be supplied to the first hose to expel the first fluid therefrom when changing from the first mode to the second mode.

19. The dispenser system of claim 18, wherein:
the controller causes air to be supplied to the second hose to expel the second fluid therefrom when changing from the second mode to the first mode.

20. The dispenser system of claim 19, further comprising:
a first pump configured to supply air to the first hose when the controller changes from the first mode to the second mode; and
a second pump configured to supply air to the second hose when the controller changes from the second mode to the first mode.

21. The dispenser system of claim 18, further comprising:
a first valve fluidly coupled downstream from the first container to control the flow of the first fluid through the first hose; and
a second valve fluidly coupled downstream from the second container to control the flow of the second fluid through the second hose.

22. The dispenser system of claim 21, further comprising a user interface in electrical communication with the controller.

23. The dispenser system of claim 22, wherein:
the user interface includes a first switch and a second switch supported by the faucet;
when the first switch is turned on while the second switch is turned off, the controller dispenses the first fluid to the faucet through the first hose; and
when the second switch is turned on, the controller dispenses the second fluid to the faucet through the second hose.

* * * * *